Sept 10, 1957   H. H. SCHAUMANN   2,805,921
PRODUCTION OF TIO$_2$
Filed Aug. 1, 1955
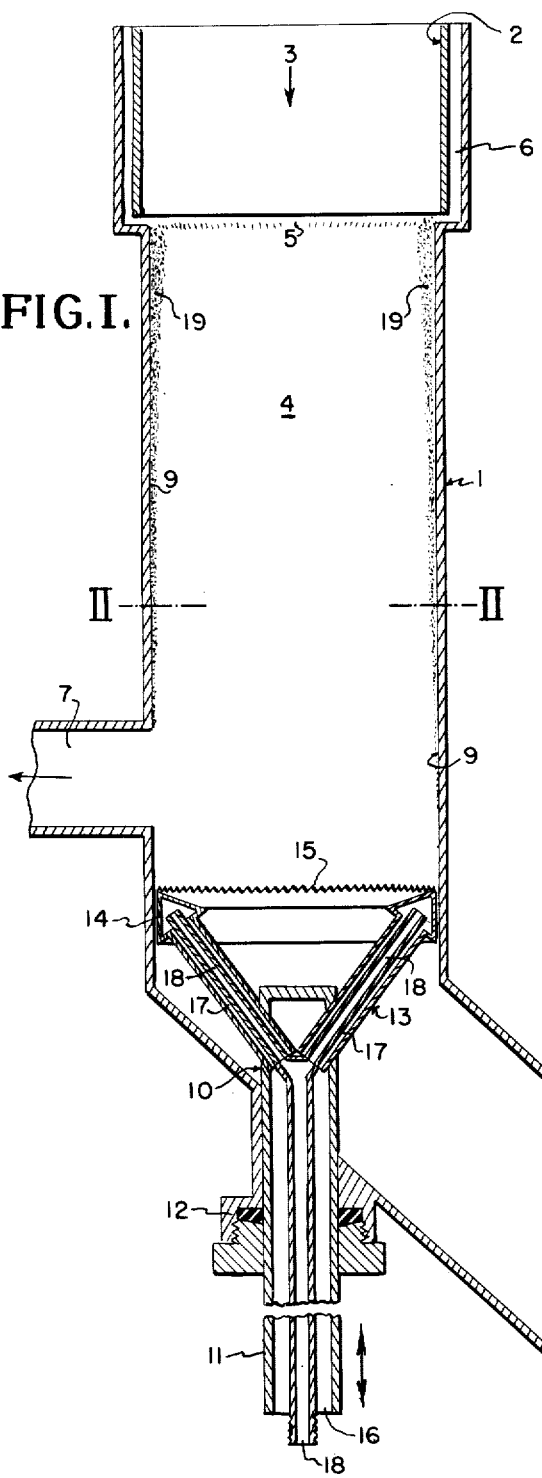
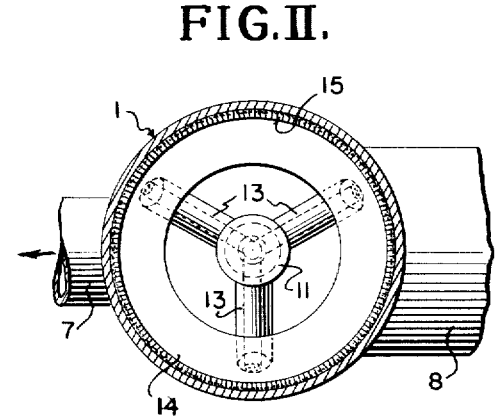
Holger H. Schaumann
INVENTOR.
BY John P. Hancock
ATTORNEY.

United States Patent Office 2,805,921
Patented Sept. 10, 1957

2,805,921

PRODUCTION OF $TiO_2$

Holger H. Schaumann, Newark, Del., assignor to E. I. du Pont de Nemours and Company, Wilmington, Del., a corporation of Delaware Application August 1, 1955, Serial No. 525,443

4 Claims. (Cl. 23—202)

This invention relates to the vapor phase oxidation of a titanium halide, and more particularly to the oxidation of titanium tetrachloride to produce pigmentary titanium dioxide therefrom. More particularly, it concerns novel methods and means for preventing objectionable oxide scale deposition and build-up on the internal walls of a reactor employed in such $TiO_2$ production. This application is a continuation-in-part of application Serial No. 201,178 filed December 16, 1950, now abandoned.

The preparation of $TiO_2$ by vapor phase oxidation of a titanium tetrahalide, particularly $TiCl_4$, is well known. Usually, the halide and oxidizing gas, preferably moisture-enriched air, are separately preheated and subsequently commingled in a hot reaction zone, the temperature of which ranges from in excess of 800° C. to about 1400° C. The reaction proceeds to form $TiO_2$ suspended in by-product gases, such as chlorine or other halogen, nitrogen and the like. Alternatively, pure oxygen or oxygen-enriched air may be used in place of air. The resulting gaseous suspension of titanium oxide particles is removed from the reactor, and the $TiO_2$ component collected through conventional filtering or settling operations. The $TiO_2$ product comprises a valuable pigment for paints or other coating compositions, as a delusterant for rayon and other textiles, and in all the usual fields where a pigment of high quality is sought.

This apparently simple vapor phase oxidation reaction is nevertheless fraught with considerable operating difficulties. A specific, major problem is the objectionable tendency of the $TiO_2$ produced within the reactor to deposit upon the reactor walls, the reactor inlet nozzles, and other hot surfaces of the apparatus. Such deposit or scale tends to adhere tightly to these surfaces, and as additional $TiCl_4$ is oxidized, additional $TiO_2$ builds up or deposits thereon until a relatively thick scale of coarse $TiO_2$ crystals forms. At times, the high temperature may cause such mass to cement or sinter and to become even more dense and hard and tightly-adhering. The presence of such $TiO_2$ scale is extremely deleterious to the efficiency of the oxidation. In the first place, the deposit on the walls and inlets induces eventual apparatus plugging and complete stoppage of the reaction. Secondly, the presence of even a lesser amount of deposit alters the cross-sectional area of the vessel and consequently objectionably varies the velocity of the reaction mixture being passed therethrough and the retention time and mixing characteristics of the reactants. All of these factors are important to the control, because variations therein quickly affect the quality of the pigment product. Hence, as deposit builds up, it becomes necessary to adjust and readjust the rates of addition of the reactants, the temperatures, and othe relatively complicated operating conditions. Eventually the productive capacity of the reactor is greatly reduced. Another disadvantage from such oxide scale deposition is that its presence interferes with heat transfer through the walls of the reactor. Heat is generally supplied to the reactor, at least initially, by external means; and conversely, the reaction being exothermic, heat is frequently later removed by cooling the chamber walls. The $TiO_2$ scale acts as an insulator, thus markedly decreasing this desired heat transfer characteristic. Furthermore, when the reaction is discontinued because of the resulting decrease in efficiency of the operation, considerable time and labor must be expended in cleaning and removing scale from the internal surfaces of the reactor. This entails a very costly, time-consuming operation wherein the danger of possible unequal contraction of the scale and reactor on coollling may cause cracking or complete breakage of such reactor. This hazard is particularly existent where, as in some cases, the vessel is fabricated of silica or similar relatively fragile substance.

Many prior attempts have been made to overcome this problem of reactor scale deposition. Among such proposals is the use of specially designed equipment having such a large cross-sectional area that the $TiO_2$ product will not come in close contact with the hot surfaces of the reactor. Another proposal is the employment of an "envelope" of inert gas around the titanium halide inlet to prevent a reaction near the inlet nozzle. These proposals, however, have not proved satisfactorily effective and furthermore have the undesired drawback of resulting in inferior pigment products. Thus, a short reactant retention time in the oxidation zone is essential to the obtainment of $TiO_2$ pigment particles possessing optimum size and quality. If, after its formation, the $TiO_2$ is allowed to remain overly long within such zone, its crystals grow to an objectionable, inordinate size, and undesirable, non-pigmentary properties, such as loss of pigment strength, will be found to develop. Obviously, a major factor in determining reaction zone retention time is the size of the reaction chamber, and large areas simply cannot be properly regulated so as to retain the reactants therein for the relatively short intervals which $TiO_2$ products of requisite quality require. The use of small reaction zones is essential for obtaining satisfactory pigment quality, and this presents the ever-recurring problem of having an efficient means for removing oxide scale deposit from the internal walls of the reactor without incurring the costly interruptions and adverse effect on the oxidation operation which have characterized prior types of $TiO_2$ oxidation processes.

It is among the objects of this invention to overcome these and other disadvantages of prior methods for obtaining $TiO_2$ through the oxidation of a titanium halide, and to provide a novel method and apparatus for attaining such objects. A particular object is to render possible the continued use of $TiO_2$ oxidation reactors of relatively small cross-sectional area which are required for achieving optimum reactant retention times and $TiO_2$ products of high pigment quality while avoiding the disadvantages which $TiO_2$ scale formation therein induces. A further object is to provide novel means for the ready and easy removal of $TiO_2$ scale deposit from the internal surfaces of an apparatus wherein a titanium halide, particularly titanium tetrachloride, is oxidized. An additional object is to effect the separation and removal of such scale from the internal surfaces of the reactor without any attendant or material damage to such reactor or substantial interference with the oxidation operation. Other objects and advantages of the invention will be evident from the ensuing description thereof and from the accompanying diagrammatic drawings wherein:

Fig. 1 is a vertical sectional view of one form of useful apparatus for carrying out the invention, and Fig. 2 is a plan view taken on a line 2—2 of Fig. 1.

The above and other objects and advantages are realized in this invention which comprises preventing oxide scale build-up upon the internal surfaces of a reactor employed in the vapor phase oxidation of a titanium halide by forcibly removing adhering scale from said surfaces during the oxidation reaction.

In a more specific and preferred embodiment, the invention comprises preventing objectionable $TiO_2$ scale deposition and build-up upon the internal surfaces of a reactor utilized in the vapor phase oxidation of titanium tetrachloride with an oxidizing gas by periodically removing scale deposit from said surfaces during the reaction by passing a rotating, reciprocally movable internally cooled cutting or shearing means adjacent to and over said surfaces. The vapor phase oxidation of titanium chloride results in the release of chlorine and other corrosive materials, and at the high temperatures inside the reactor, the cutting element can be severely corroded so that discoloring impurities are introduced into the white titanium dioxide. My invention overcomes this problem by internally cooling the cutting or shearing means so that it is maintained at a temperature sufficiently below that of the reaction to prevent discoloration of the pigment.

Referring to the drawings, wherein like numbers designate like parts throughout, and particularly to Fig. 1, there is shown a vertical, cylindrical type of closed reactor, which is relatively restricted in cross section, constructed, preferably, of nickel, steel, or other suitable material, including corrosion-resistant metals or alloys, and adapted to be externally cooled by conventional means to prevent corrosion of the metal and subsequent discoloration of the pigment product when employed in vapor phase titanium halide oxidation. Preferably, said reactor comprises the type wherein vapor phase rapid admixture and reaction of an oxidizable titanium halide with an oxidizing gas is had to obtain pigment-quality $TiO_2$. It comprises a tubular conduit 2 having an inlet 3 through which a reactant (from a source of supply not shown) can be separately and continuously charged, at a controlled rate, into a reaction zone 4. Prior to introducing said reactant into said zone, it is first quickly mixed with another reactant being separately, simultaneously and continuously charged, also at a controlled rate, into said conduit 2 through an inlet 5 communicating with a conduit 6 concentrically disposed about conduit 2 and in communication with a source of reactant supply (also not shown). Conduit inlet 5 consists preferably of a transverse, elongated peripheral or circumferential slot opening formed in the conduit 2 and functions to discharge its reactant into the conduit 2 in the form of a relatively thin, sheeted stream; flowing radially towards the center of said conduit and at right angles to and across the axis of flow of the other reactant simultaneously charged therethrough from the inlet 3. As a consequence, substantially instantaneous reactant mixing takes place upon the reactants coming together within conduit 2 and immediately prior to their discharge into the reaction zone 4. A suitable reactor outlet 7 is disposed below the reaction zone 4 through which outlet gaseous and suspended products of reaction are readily withdrawn from the reactor. An additional outlet in the form of a chute 8 is provided in the base of the reactor, said chute being adapted to be closed from the atmosphere, and functioning to effect removal of solid $TiO_2$ products separated from the walls of the reactor as adhering scale in accordance with this invention and as will be described hereinafter.

Suitably arranged for rotary and reciprocal movement within the reactor so that it can be passed over and in close proximity to its internal walls 9 from immediately below inlet 5 to the reactor base, and more especially over the reaction zone surfaces, is a scraping device 10 adapted to be manually or mechanically actuated. It comprises a vertical shaft 11 projecting upwardly, as shown, through the base of the reactor into the interior thereof, which shaft is journalled for rotary and oscillatory movement in the reactor casing by conventional bearing and stuffing box means 12 so that effective sealing off of the interior of the reactor from the atmosphere is had. Fixedly mounted on shaft 11 by means of brackets 13 and movable in response to said shaft is an open ring or other form of cylindrical cutting head or shearing element 14, the teeth or a serrated cutting edge 15 of which will remove scale deposit from the walls 9 when the shaft 11 is manually or power actuated. Internal cooling means adapted to maintain the scraping element 10 in relatively cool condition during use or disuse is also provided, said means comprising a channel 16 in the shaft 11 and channels 17 and 18 in brackets 13, whereby water or other desired cooling fluid can be continuously passed or circulated therethrough, as for instance by passing such coolant upwardly through channels 16 and 17 and thence downwardly for withdrawal through channel 18. The scraper shaft is rotated by a geared motor drive and vertically actuated by a hydraulic ram. The cooling fluid is fed to the entrance pipe through a rotating coupling and leaves the exit pipe by means of another rotating outlet fitting.

In operating a device of the type described, the methods disclosed in my U. S. Patent No. 2,488,439, issued November 15, 1949, or in U. S. Patent No. 2,559,638 issued July 10, 1951 to Ignace J. Krchma and myself, can be effectively utilized. In such methods, pigment-quality titanium dioxide, in rutile or anatase crystalline form, is obtained from the vapor phase decomposition, at a temperature in excess of 800° C., and preferably from 900–1350° C., of a titanium halide, such as titanium tetrachloride, with an oxidizing gas, such as air, oxygen, etc., in the presence of regulated small amounts (ranging from .05% to 10% by volume, based on the total volume of gases being reacted and preferably from .1% to 5% by volume) of water vapor. In U. S. Patent No. 2,559,638, such oxidation reaction is effected in the presence also of a relatively small amount (.05% to 10% by weight, on the $TiCl_4$ basis) of aluminum chloride, which also forms a white, water-insoluble oxide during the oxidation, so that recovery can be effected of a $TiO_2$ precipitate adapted on mild calcination (say, 600° C.) in the dry state to yield an improved, substantially neutral (pH 6.5–7.5) $TiO_2$ pigment exhibiting softer texture characteristics and adapted to be more readily ground to desired super fineness.

Thus, in applying such methods to this invention, the oxidizing gas, preheated to a temperature above 350° C., is separately and continuously fed into conduit 2 via inlet 3 for passage therethrough at a controlled velocity. Simultaneously, vaporized titanium tetrachloride at approximately the same temperature as the oxidizing gas is separately and continuously conducted, at a controlled mass velocity ranging preferably from about 15–40 times the mass velocity of the oxidizing gas, from conduit 6 through the inlet slot 5. As a result, the $TiCl_4$ will issue or flow into conduit 2 from inlet 5 in a radial direction and as a relatively thin sheet or stream flowing at substantially right angles to the direction of flow of the oxidizing gas. Substantially instantaneous mixing and reaction thereby occur, with substantially complete reaction taking place within but a relatively short distance downstream in the reaction zone 4 from the inlet 5. The resulting gaseous products of reaction containing in suspension the greater part of the $TiO_2$ under production are then continuously withdrawn from the reactor through outlet 7, the $TiO_2$ being ultimately separated and recovered therefrom by suitable collecting means. By the procedures above outlined, recourse will be had to reaction zone retention times for the reactants and reaction products ranging from .05 to 5 seconds, and usually from .1 to 1 second.

As the $TiO_2$ suspension proceeds downwardly through the reaction zone, a portion of the $TiO_2$ tends to adhere as an objectionable coarse scale deposit 19 upon and along the walls 9 of said zone, being heaviest, as shown, at a point immediately adjacent the inlet 5 and gradually decreasing in quantity as the reaction outlet 7 is approached. As the reaction proceeds, this scale deposit continues to build up until eventual plugging and stoppage of the apparatus occurs.

In accordance with the invention, removal of such objectional deposit from the reactor walls is effected either as the deposit is formed or intermittently and as required by the conditions of temperature and flow through the reaction chamber. This is brought about by continuously or periodically passing the internally cooled scraper device 10 in cutting or scouring relationship over said walls, whereby the cutting edge 15 of said device will effectively cut away and dislodge any adhering $TiO_2$ scale. This is accomplished by connecting the shaft 11 outside the reactor to a suitable driving mechanism adapted to push the shaft, at will, upwardly into the main body of the chamber and at the same time to rotate it so that circular motion will be imparted to its surmounted head member 14. This combination of vertical thrust with rotating cutting action affords most efficient results, and, depending on the particular driving mechanism chosen, both the speed of vertical movement and the speed of rotation of the shaft can be varied separately as desired to provide maximum efficiency. Scale removed during the scraping operation can be allowed to simply flow downwardly through the open scraper ring and into the reactor base for withdrawal through exit 8 for separate recovery.

It will be realized that there is a tendency for a deposit to build up on the cutter. However, I have found that by cooling the cutter or scraping element any deposit which collects on the element is softer and less adherent than it would be if the element were not cooled. Usually the movement of the scraper is sufficient to keep the cooled scraper substantially free of deposits.

From the foregoing, it will be seen that the present invention comprises conducting a $TiCl_4$ oxidation reaction in a chamber fitted with a mechanically operating internally cooled scraping device which will effectively remove objectionable $TiO_2$ scale deposit from the internal surfaces of said chamber, said device functioning either continuously, whereby deposits are removed almost as soon as they are formed, or intermittently, and as required by the conditions of temperature and flow through the reactor. In either event, the mechanization of the scraping process obviates any need to interrupt the oxidation reaction to effect apparatus cleaning, as required heretofore. The scale thus removed can be readily withdrawn from the chamber either with the usual $TiO_2$ gaseous suspension, or since it generally comprises larger and denser particle aggregates than the desired product suspension, it may be removed separately after being allowed to fall into the base of the reactor.

When periodic operation of the scraper is resorted to, it will be found preferable to scrape the reactor surface before wall scale has built up to a degree which substantially alters the operating conditions within the reactor and results in inferior quality of pigment. Specifically, when the build-up has markedly decreased available reactor cross section, retention time of the mass in the chamber is lessened so materially that proper reaction does not occur. In order to avoid such marked decrease in cross section and consequently in retention time and to maintain a reaction efficiency requisite for good quality of pigment product, scraping of the chamber should be resorted to before the $TiO_2$ wall scale buildup closes about 40% of the reactor cross sectional area, with such buildup being preferably removed prior to the time it encroaches upon and blocks, say, 10% of said area.

To a clearer understanding of the invention, the following specific examples are given, these being merely in illustration but not in limitation of the invention:

*Example I*

A vertical, cylindrical reactor as shown in the drawings, constructed of nickel, and having a 9″ internal diameter, was utilized in the co-oxidation of titanium tetrachloride and aluminum chloride. The top lip of the slot inlet 5 was constructed of fused silica and heated externally to avoid excessive loss of temperature in the preheated reactant gases prior to their admixture in the reaction zone 4. The reactor was equipped with an internal water cooled mechanical scraper as shown in the drawing. It is provided with an open, ring type of cutting head, the external diameter of which was slightly less than the internal diameter of the reactor, so that it could be readily moved in slideable engagement over the internal walls of said reactor. The cutting head of the scraper was surmounted on a central shaft adapted to be hydraulically operated in vertical, reciprocal motion and rotatable horizontally by means of an electrically driven motor connected to said shaft at its point of terminus outside the reactor. Vertical travel of the scraper within the reactor extended from below reactor outlet 7 upwardly to the lower edge of the slotted inlet 5. Purified titanium tetrachloride, at a rate of 1250 lbs. per hour, was separately preheated to 950° C., and aluminum chloride vapor equivalent to 5 lbs. per hour $Al_2O_3$ was mixed therewith. The combined vapors were continuously charged into the reactor through the inlet 5. Dry air, at a rate of 1050 lbs. per hour, was preheated to 1030° C., and water amounting to 6.2 lbs. per hour was added thereto by combustion of the equivalent quantity of acetylene in the preheated air, and the resulting mixture was concurrently charged to the reactor as a stream of hot, moisture-enriched air, being admitted thereto via inlet 3, arranged coaxially with the reactor itself. The two streams, the chloride vapors and the moist air, become quickly commingled and reacted within the reaction zone, the chlorides being oxidized to form solid $TiO_2$ particles associated with a small amount of $Al_2O_3$, suspended in $Cl_2$ and by-product gases.

The reaction was operated continuously for 8 hours, during which time the mechanical scraper element was driven up and down once every 15 minutes over the reaction zone surfaces, 40 seconds' total travel time being required in each cycle. During its vertical motion, continuous rotation of the shaft on its axis was also resorted to, to result in the impartation of rotary movement to the scraper.

The oxidation products leaving the reactor through outlet 7 were cooled and the $TiO_2$ pigment separated from the chlorine-containing gases by filters. The collected rutile pigment was found to be uniformly excellent in pigment properties over the entire run and contained negligible amounts of sintered $TiO_2$ aggregates and wall scale coarser than 325 mesh. Small amounts, averaging less than 10 lbs. per hour, of non-pigment quality $TiO_2$ wall scale, dislodged from the surfaces of the reactor as a result of the periodic scraping resorted to during the run, were withdrawn periodically from the reactor through the chute 8 in the base of the chamber.

In an attempt to duplicate the above operation but without recourse to use of the scraping device, it was found that at the end of 30 minutes' operation, reactant flow rates had to be reduced 35% to compensate for the increased pressure drop which developed in the reactor due to objectionable scale deposition. The operation had to be discontinued entirely after one hour, due to substantially complete plugging of the reactor with a sintered, coarsely crystalline mass of $TiO_2$ adhering to the reactor walls and extending inwards therefrom a short distance below the $TiCl_4$ inlet 5. This sintered $TiO_2$ buildup, after being laboriously removed by hand scraping was found to be equivalent to 10% of the $TiCl_4$ oxidized.

*Example II*

Example I was repeated, except that aluminum chloride use was dispensed with. In this instance, substantially equivalent results were found to obtain, with production of an excellent quality rutile $TiO_2$ pigment, when use was made of the internally cooled scraper element during the run; however, objectionable TiO₂ wall scale build-up and accumulation was found to result with apparatus plugging and shut-down occurring after one hour of operation when wall scouring and scraping with the scraper element was not resorted to.

While a particular form of scraper device has been described, it will be understood that the invention is not restricted thereto and that the actual design of apparatus to be employed in any given instance can be left to the individual engineer according to the size, shape and capacity of the particular titanium tetrahalide oxidation reactor and type of reactant inlet jets being employed. Frequently, a saw-toothed scraping head, e. g., a water-cooled ring equipped with cutting teeth, will be found most preferred for use. Obviously, it is not essential that the scraper head comprise a closed circle, the center of which ring is open to permit the freed scale to drop through downward into the collecting system. If desired, such head can consist of segments of a circle or simply comprise one or more arms provided with cutting edges adapted to project from the rotating shaft so that relatively close clearance will be maintained between the ends of the arms and the reactor walls over which such cutting edges are to pass. Similarly, a helical form of scraper supported by projecting arms from a central shaft can be resorted to. Since efficiency is the main and controlling consideration in the type of scraper used, a relatively sharp-edged device will be found preferable for employment. Care must be observed, however, not to design or employ an apparatus which will be so rough in its operation that the delicate reactor surfaces will be injured or bits of metal chipped off therefrom which would contaminate the product pigment. Accordingly, the material of construction of the reaction chamber, the operating conditions of the reaction, the character of the oxide scale under such conditions, as well as similar and related factors, will govern the choice and particular form of scraping device which is to be used.

While air humidified to the extent indicated above, comprises a preferred type of oxygen-containing gas for employment in the invention, other gaseous substances, including oxygen, oxygen-enriched air, or mixtures of oxygen or air with various inert gases, can also be utilized. Similarly, although amounts of aluminum chloride ranging from .1% to 10% by weight based on the TiCl₄ have been mentioned, optimum results will be found to accrue from the use of amounts under 5%, and particularly from about .5% to 4%. Hence, such latter amounts of aluminum chloride are preferred for use in the invention.

Although a small amount of aluminum chloride comprises a preferred reactant in the co-oxidation of titanium tetrachloride, other volatilizable metal halides, particularly chlorides yielding white, insoluble oxides, can be employed in conjunction with TiCl₄ in amounts which accord with the results desired and the type of pigment product being manufactured. Examples of such materials include the chlorides of silicon, zirconium, antimony, zinc and tin. These metal halides may be used individually with the TiCl₄ and the aluminum chloride, or mixtures thereof can be resorted to. As in the instance of aluminum chloride, the amount of additional metal halide used can be relatively small; e. g., it may range from 0.1% to 10% by weight, based on the weight of the TiCl₄ and AlCl₃.

While the invention has been described in connection with an oxidation reaction in which the TiCl₄ reactant is charged from a peripheral inlet into a conduit for mixing and reaction with an oxdizing gas passing through said conduit, it will be understood that it does not matter which reactant enters through said slot and that a converse operation is equally operable and utilizable in the involved decomposition reaction.

I claim as my invention:

1. A method for preventing oxide scale accumulation on the internal walls of a closed reactor formed thereon during the vapor phase exothermic oxidation reaction of a titanium halide which comprises shearing said scale from the surface of said walls during the oxidation reaction by moving a scale dislodging, internally cooled cutting element over said surfaces.

2. A method for preventing adhering titanium oxide scale from accumulating on the internal walls of a closed reactor formed thereon during the vapor phase exothermic oxidation reaction of titanium tetrachloride with an oxidizing gas which comprises dislodging and removing said titanium oxide scale from said walls by moving an internally cooled cutting element over and adjacent to the surfaces of said walls during the oxidation reaction.

3. A method for preventing titanium oxide scale from accumulating on the internal walls of a closed reactor formed thereon during the vapor phase exothermic oxidation reaction of titanium tetrachloride with an oxidizing gas which comprises periodically dislodging and removing said scale from said walls by intermittently passing an internally cooled cutting element over and adjacent to the surfaces of said walls during the oxidation reaction.

4. A method for preventing titanium oxide scale from accumulating after deposit on the internal walls of a closed reactor formed thereon during the vapor phase exothermic oxidation reaction of titanium tetrachloride with an oxidizing gas which comprises forcibly removing said scale from said walls by intermittently passing an internally cooled cutting element over and adjacent to the surfaces of said walls throughout the oxidation reaction.

References Cited in the file of this patent

UNITED STATES PATENTS

| | | |
|---|---|---|
| 1,304,212 | Slocum | May 20, 1919 |
| 1,307,724 | Coast | June 24, 1919 |
| 1,428,338 | Monley | Sept. 5, 1922 |
| 2,255,060 | Houdry | Sept. 9, 1941 |
| 2,615,794 | Shelby | Oct. 28, 1952 |

UNITED STATES PATENT OFFICE
CERTIFICATE OF CORRECTION

Patent No. 2,805,921                 September 10, 1957

Holger H. Schaumann

It is hereby certified that error appears in the printed specification of the above numbered patent requiring correction and that the said Letters Patent should read as corrected below.

Column 1, line 54, after "oxidation" insert -- reaction --; line 66, for "othe" read -- other --; column 2, line 11, for "coolling" read -- cooling --; column 8, line 47, for "intermittently" read -- continuously --

Signed and sealed this 29th day of October 1957.

(SEAL)

Attest:
KARL H. AXLINE
Attesting Officer

ROBERT C. WATSON
Commissioner of Patents